Nov. 11, 1952     W. E. LARGE     2,617,977
VOLTAGE REGULATING CIRCUIT
Filed April 27, 1949
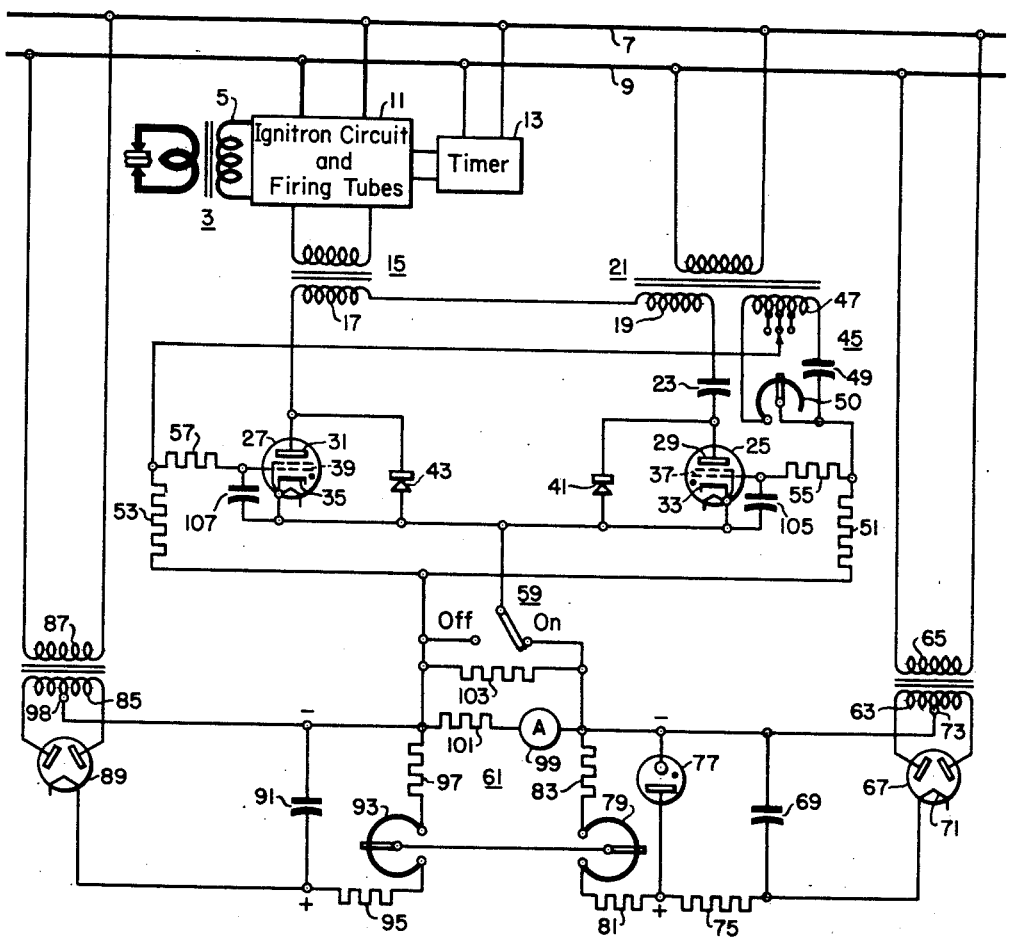
INVENTOR
William E. Large.
BY
*Byrnes Diamond*
ATTORNEY
WITNESSES:
*Robert C Baird*
*Nw. C. Groome*

Patented Nov. 11, 1952

2,617,977

UNITED STATES PATENT OFFICE 2,617,977

VOLTAGE REGULATING CIRCUIT

William E. Large, Tonawanda, N. Y., assignor to Westinghouse Electric Corporation, East Pittsburgh, Pa., a corporation of Pennsylvania Application April 27, 1949, Serial No. 89,991

5 Claims. (Cl. 323—22)

My invention relates to electric discharge apparatus, and it has particular relationship to apparatus for precisely controlling the conductivity of electric valves such as ignitrons.

While my invention has general utility, it is peculiarly adapted for controlling the flow of current through the main valves of a high precision welding system. Such welding apparatus derives its power from the buses of an ordinary commercial supply which is available in a manufacturing plant where the apparatus is used. While on the whole, welding apparatus of the type currently available operates satisfactorily, difficulties are encountered on occasions. At times, the welds produced are not uniform. On rare occasions, the quality of the welds is not of the high standard demanded by the automobile industry, for example, and indispensable to the aircraft industry.

It is, accordingly, an object of my invention to provide a welding system with which welds of uniform high quality shall be attainable.

Another object of my invention is to provide a control for a welding machine, in cooperation with the machine shall yield welds of uniform high quality.

An ancillary object of my invention is to provide a low-cost control which shall operate to maintain current flow uniform independently of fluctuations in a power supply.

Another ancillary object of my invention is to provide a control of simple structure which shall maintain current flow through a load independent of the fluctuations of the voltage of the supply.

Still another ancillary object of my invention is to provide a control system for a welder which shall maintain the current flow through the material to be welded independent of supply potential variations over a wide range of heat parameter settings.

My invention arises from the realization that the quality and uniformity of welds are often deleteriously affected by fluctuation of the voltage at the buses from which the welding power is derived. This fluctuation arises by reason of the fact that in many plants in which welders are used, the buses supply, in addition to a particular welder under observation, a number of other machines including other welders, heavy-duty motors and other components which intermittently impose such a load on them that their voltage drops materially when the load is imposed and rises materially when the loading is discontinued. This drop in voltage may occur during, or just before, a welding operation. The current available for welding is thus suddenly reduced or increased and the welds produced suffer in quality and uniformity.

In accordance with my invention, the current flow through the material to be welded is maintained uniform independently of source voltage fluctuation by operation of a comparison network. In this network, two potentials are balanced, one a constant potential the magnitude of which is dependent on the magnitude of the heat parameter desired and the other a potential proportional to the potential of the supply. The difference between these potentials appears at the output of this network and is impressed as a direct-current potential to correct for variations in the supply potential.

In one of its specific aspects, my invention is applied in a system such as is shown in an application Serial No. 642,040, filed January 18, 1946, now Patent Number 2,504,834 issued April 18, 1950, to Edward C. Hartwig, and assigned to Westinghouse Electric Corporation. In that application, a system for providing impulses of short duration for controlling the conductivity of electric valves is disclosed. This system includes a pair of thyratrons each shunted by a rectifier preferably of the dry type connected to conduct current of a polarity opposite to that conducted by the thyratron. The anodes of the thyratrons are connected together through a circuit including an alternating power supply, an output component and a condenser. The cathodes are connected to a common conductor. The thyratrons are controlled by a composite potential made up of an alternating potential derived from the supply but shifted in phase with reference to the supply potential and a variable direct-current potential. As the polarity of the supply changes, one or the other of the thyratrons is rendered conductive and the capacitor is charged and recharged. Current surges of short duration compared to half periods of the supply flow through the circuit to charge and recharge the capacitor, and these surges are utilized for firing other valves or for any other purpose that such surges may be used.

The correcting direct-current potential is impressed in the control circuits of the thyratrons of the system described in application Serial No. 642,040. This correcting potential is manifested as a departure, positive or negative, from a preset potential which has a predetermined magnitude for a selected supply potential. Preferably this predetermined potential is zero. Variations of the supply potential of one polarity or the other results in a change in potential at the output of the network which is positive or negative and the magnitude of which depends on the departure of the source potential from the magnitude of the potential for which the network was set. This different potential superimposed on the alternating potential impressed in the control circuits of the thyratrons varies the instants in the half periods of supply at which the thyratrons are rendered conductive. This variation is in such a sense as to fire the main valves sufficiently earlier or sufficiently later in the half periods of the supply to correct for the variations of the source potential.

The novel features, which I consider characteristic of my invention, are set forth with particularity in the appended claims. The invention itself, however, together with its objects and advantages thereof may be understood from the following description of a specific embodiment when read in connection with the accompanying drawing, in which:

Figure 1 is a circuit diagram of a preferred embodiment of my invention; and

Fig. 2 is a graph illustrating the operation of my invention.

The apparatus shown in Figure 1 comprises a welding transformer 3, the primary 5 of which is supplied from a pair of supply buses 7 and 9 through an ignitron circuit 11. The ignitron circuit 11 is controlled from a timer 13 which determines the duration of the time intervals during which the ignitrons are conductive and form a transformer 15 through which impulses are supplied to fire the ignitrons at instants in the desired half periods in the supply.

The primary 17 of the transformer 15 is supplied from the secondary 19 of a supply transformer 21 through a capacitor 23 and a pair of thyratrons 25 and 27. Each of the thyratrons 25 and 27 includes an anode 29 and 31, a cathode 33 and 35 and a control electrode 37 and 39. Between each anode 29 or 31 and each cathode 33 or 35, respectively, a rectifier 41 or 43, respectively, preferably of the dry type, is connected in such a sense as to conduct current of opposite polarity to that conducted by its associated thyratron.

The capacitor 23 is connected in series with the secondary 19 of the supply transformer and the primary 17 of the control transformer 15 between the anodes 29 and 31 of the thyratrons. The cathodes 33 and 35 of the thyratrons are connected together.

The thyratrons 25 and 27 are controlled from a phase shift network 45 which derives its power from a secondary 47 of the supply transformer 21. This network includes a capacitor 49 and a voltage divider 50. A pair of resistors 51 and 53 are connected between an intermediate tap of the secondary 47 and the junction of the capacitor 49 and the voltage divider 50. The control electrode 37 is connected to the junction of the resistor 51 and the capacitor 49 through a current limiting resistor 55; the control electrode 39 is connected to the junction of the resistor 53 and the intermediate tap through a current limiting resistor 57. The common junction of the cathodes 33 and 35 may be connected to a point intermediate the two resistors 51 and 53 of the network 43 through an "on-off" switch 59 when the latter is in the "off" position. When the apparatus is so connected, the potential supplied from the network 45 is of such polarity as to render the thyratrons 25 and 27 conductive at instants in the half periods of the supply predetermined by the setting of the network 45. In the "on" position of the switch 59, a direct-current potential derived from a comparison network 61 is superimposed on the alternating-current phase-shifted potential derived from the network 45. This direct-current potential depends on the relationship between the potential of the supply buses 7 and 9 when the comparison network is preset and the potential of these buses at the instant under observation and also on the heat parameter setting of the system.

The comparison potential has two components, one component is derived from the power supply through the secondary 63 of the auxiliary transformer 65 and a full-wave rectifier 67 connected to the secondary. The output of the rectifier 67 is filtered by a capacitor 69 connected between its cathode 71 and an intermediate tap 73 of the secondary 63 and a resistor 75 connected at one terminal to the cathode 71. A regulator tube 77 is connected between the other terminal of the resistor 75 and tap 73. At the terminals of the regulator tube, a potential substantially independent of the source potential exists. A voltage divider 79 is connected across the regulator 77 in series with a pair of resistors 81 and 83. The other comparison potential component is derived from the supply 7—9 through the secondary 85 of a second auxiliary transformer 87 and a full-wave rectifier 89 supplied from it. The output of the rectifier is also filtered by a capacitor 91. Across the capacitor, another voltage divider 93 is connected in series with a pair of resistors 95 and 97.

The adjustable taps of the voltage dividers 79 and 93 are connected together. The negative terminal (connected to tap 73) of the regulator 77 is connected to the On contact of the switch 59. The intermediate tap 98 of the secondary 85, which is the negative terminal of the rectifier circuit 85—89, is connected directly to the junction of the phase-shift resistors 51 and 53. Between these negative terminals 73 and 98, an ammeter 99 is connected in series with a resistor 101; a second resistor 103 is directly connected across the negative terminals. The output of the comparison network 61 may be derived at the terminals of the resistor 103. This output is impressed between the common junction of the cathodes 33 and 35 of the thyratrons 25 and 27 and the resistors 51 and 53 of the phase-shift network 45; it is thus superimposed on the alternating potential provided by the phase-shift network 45.

The instant in the half periods when the thyratrons 25 and 27 are fired is dependent on the magnitude of the net potential which appears at the output 103 of the comparison network 61. If this net potential is zero, the thyratrons are fired at instants in the half periods corresponding to the setting of the phase-shift network 45. If the right-hand terminal of the comparison network 61 is positive relative to the left-hand terminal, the thyratrons 25 and 27 are fired at later instants in the half period than for the zero potential condition, and if the left-hand terminal is positive relative to the right-hand terminals, the thyratrons are fired earlier in the half periods than for the zero potential condition.

In operation, the voltage divider 79 connected across the regulator 77 is set at a predetermined setting. The other voltage divider 93 is now set so that the ammeter 99 across the output terminals 103 of the network 61 reads zero. Under these circumstances, the potential which appears at the output of the comparison network 61 is zero and the thyratrons 25 and 27 conduct at instants predetermined by the setting of the voltage divider 50 in the phase-shift network 45. The impulses delivered through the control transformer 15 by reason of the conductivity of the thyratrons 25 and 27 cause ignitrons (not shown) in series with the primary 5 of the welding transformer 3 to fire at instants in the half periods corresponding to the heat setting of voltage divider 50. If under these circumstances, the source (7-9) potential should increase the potential impressed at the output of the comparison network 61 would change in such a sense that the left-hand terminal of the network would become more negative than the right-hand terminal. The firing of the thyratrons 25 and 27 would then be delayed, and the increase in the source potential would be compensated. The current conducted by the ignitrons and the primary of the welding transformer would then remain unaffected by the change. A similar compensating effect is produced if the source voltage decreases.

The sensitivity of the system to source voltage fluctuations is dependent on the settings of the voltage dividers 79 and 93. The smaller the two potentials which are balanced against each other, the less the sensitivity. For example, if the voltage divider 79 across the regulator 77 is set to provide a potential of −50 volts at its associated output terminal, and the other voltage divider is set to counteract this potential, a variation of 10% in the supply voltage produces a variation of only 5 volts at the output of the comparison network; on the other hand, if the setting is such that −100 volts at one terminal of the network 61 is compensated by −100 volts at the other terminal, a 10% variation in the supply voltage results in a 10 volt compensating effect at the output 103 of the comparison network 61. It is desired that the sensitivity of the voltage comparison network correspond to the current to be conducted through the material to avoid over or undercorrection. The desired setting is determined by the power factor of the system and the heat parameter (or the heat control as it is sometimes called) which may be attained with the system.

The desired heat parameter is attained by setting the voltage divider 50 of network 45. The voltage divider 79 must now be set to correspond to the heat setting. Thereafter, the voltage divider 93 must be set so that the voltage at the output 103 of the network 61 is zero (or the desired magnitude). The proper setting of voltage divider 79 for any power factor and any desired heat may be determined from a series of calibration curves which are plotted from experimental data. Typical curves are shown in Fig. 2. In Fig. 2, settings of voltage divider 79 are plotted vertically and heat parameter settings are plotted horizontally. Each of the curves corresponds to a different power factor. For any power factor and for any heat, a setting of the voltage divider 79 corresponds to the ordinate of a point on the corresponding power-factor curve. The abscissa of this point is given by the heat setting. For example, if the power factor is .4 and the heat setting is 80%, the corresponding setting of voltage divider 79 is 61. For convenience in setting up the apparatus, the voltage dividers 79 and 93 may be ganged.

When less than maximum current is being conducted, the correcting voltage impressed at the output terminals 93 of the comparison network 61, which is in magnitude dependent on the setting of voltage divider 79 (that is, on the heat setting, and the power factor), is smaller than the maximum attainable correcting voltage by a predetermined magnitude. This magnitude is such that the correcting voltage is proportional to the current conducted through material to be welded. The correction applied is then proportional to the current conducted through the material and overcorrection is avoided.

A typical system constructed in accordance with my invention has the following components:

| Component: | Type |
|---|---|
| Thyratron 25 | WL 2050 |
| Thyratron 27 | WL 2050 |
| Regulator 77 | VR 150 |
| Rectifier 67 | 80 |
| Rectifier 89 | 80 |
| Dry rectifier 41 | Westinghouse style 1412394 |
| Dry rectifier 43 | Westinghouse style 1412394 |
| Capacitor (pulsing) 23 | .25 microfarads |
| Capacitor (surge suppressing) 105 | .002 microfarads |
| Capacitor (surge suppressing) 107 | .002 microfarads |
| Resistor 51 | 20000 ohms |
| Resistor 53 | 20000 ohms |
| Capacitor (phase shift) 49 | 1 microfarad |
| Voltage divider 50 | 5000 ohms |
| Resistor (current limiting) 55 | 1 megohm |
| Resistor (current limiting) 57 | 1 megohm |
| Capacitor (filtering) 69 | 4 microfarads |
| Resistor (filtering) 75 | 22000 ohms |
| Voltage divider 79 (regulated) | 70000 ohms |
| Voltage divider 93 (unregulated) | 50000 ohms |
| Resistor 81 (regulated) | 68000 ohms |
| Resistor 95 (unregulated) | 10000 ohms |
| Resistor 83 (regulated) | 10000 ohms |
| Resistor 97 (unregulated) | 4700 ohms |
| Resistor 101 (ammeter) | 1 megohm |
| Resistor 103 (output) | .22 megohms |
| Capacitor (filtering) 91 | 1 microfarad |

While I have shown and described a specific embodiment of my invention, many modifications thereof are possible. My invention, therefore, is not to be limited except insofar as is necessitated by the prior art and by the spirit of the appended claims.

I claim as my invention:

1. For use with an alternating supply the combination comprising a welder including a welding transformer; a circuit connected to the primary of said transformer and adapted to be energized to cause current pulses to flow through said transformer during selected half periods of said alternating supply; and a control circuit coupled to said first-named circuit, adapted to be energized to initiate each of said current pulses at a predetermined instant in its corresponding half period of the supply by supplying a potential pulse which rises to a predetermined magnitude at said instant, said control circuit including a first network for supplying an alternating potential, which first network includes a component for presetting the phase of said alternating potential relative to the supply potential in accordance with a desired heat parameter, and a second network for superimposing on said alternating potential a direct-current potential, the magnitude of said direct-current potential determining the instant in the half periods of said supply when said potential pulse rises to said magnitude; and said second network including connections for deriving a first potential from said supply which is independent of the potential of said supply but the magnitude of which depends on the heat parameter of said welder to be selected by the operator, connections for deriving a second potential from said supply dependent on the potential of said supply and connections for comparing first and second potentials to derive said direct-current potential.

2. In combination a first terminal for connection to an alternating-current supply; a second terminal for connection to an alternating-current supply; a first voltage absorbing component; connections between said component and said terminals including a first rectifier for impressing a first rectified potential across said component; connections across said component for limiting the maximum of said rectified potential to a predetermined magnitude; a third terminal for deriving an alternating potential; a fourth terminal for deriving an alternating potential; a second voltage absorbing component, connections between said third and fourth terminals and said second component, including a second rectifier, for impressing a second rectified potential across said second component; a connector directly connected to a first electrical point on said first component selectable at the will of an operator to a second electrical point on said second component selectable at the will of an operator; and connections for deriving a potential dependent on the drift of the potential of said second point.

3. For use with an alternating-current supply the combination comprising an electric discharge device having a control electrode and a plurality of principal electrodes; connections for impressing an alternating potential from said supply between said principal electrodes; a network for deriving from said supply a potential displaced in phase by a predetermined magnitude with reference to the potential impressed between said principal electrodes; a first rectifier operating independently of said network and including output buses, adapted to be connected to said supply for impressing across said buses a first rectified potential derived from said supply; connections for limiting the maximum of said first potential to a predetermined magnitude, said potential of predetermined polarity being derivable at a first pair of terminals; a second rectifier operating independently of said network and including output buses, adapted to be connected to said supply for impressing across said last-mentioned buses a second rectified potential derived from said supply, said second rectified potential being derivable at a second pair of terminals; a component connecting together the one terminal of each of said first and second pair of terminals which are of like polarity; and connections adapted to connect in series the remaining terminals of said pairs, said phase-shifted potential, said control electrode and one of said principal electrodes.

4. For use with an alternating-current supply the combination comprising an electric discharge device having a control electrode and a plurality of principal electrodes; connections for impressing an alternating potential from said supply between said principal electrodes; a network for deriving from said supply a potential displaced in phase by a predetermined magnitude with reference to the potential impressed between said principal electrodes; a first rectifier operating independently of said network and including output buses, adapted to be connected to said supply for impressing across said buses a first rectified potential derived from said supply; connections for limiting the maximum of said first potential to a predetermined magnitude; connections for deriving a portion of said potential of predetermined magnitude which portion shall be preselectable at the will of the operator, said portion of said potential of predetermined polarity being derivable at a first pair of terminals; a second rectifier operating independently of said network and including output buses, adapted to be connected to said supply for impressing across said last-mentioned buses a second rectified potential derived from said supply; connections for deriving a portion of said second rectified potential which portion shall be preselectable at the will of the operator, said last portion of said second rectified potential being derivable at a second pair of terminals, said portions being selected so that in the manual operation of said apparatus the potentials derivable at said first and second pairs of terminals are equal for a selected potential of said supply; a component connecting together the one terminal of each of said first and second pair of terminals which are of like polarity; and connections adapted to connect in series the remaining terminals of said pairs, said phase-shifted potential, said control electrode and one of said principal electrodes.

5. For use with an alternating-current supply the combination comprising a first thyratron having an anode, a cathode and a control electrode; a second thyratron having an anode, a cathode and a control electrode; a first rectifier; a second rectifier; a first pair of terminals deriving from said supply and supplying an alternating potential; a capacitor; an output component; a first circuit including in series the cathode and anode of said first thyratron, said output component, said terminals, said capacitor and said second rectifier; a second circuit including in series said cathode and anode of said second thyratron, said capacitor, said terminals, said component and said first rectifier; a network for deriving potentials displaced in phase with reference to the potential derivable from said first terminals, said network having an intermediate tap and a pair of end taps, the potentials derivable between said intermediate tap and said end taps being of opposite phase; a third rectifier operating independently of said network to be coupled to said supply for deriving from said supply a first rectified potential; connections for limiting the maximum of said potential to a predetermined magnitude, said potential of predetermined magnitude being derivable at a first voltage absorbing component across a second pair of terminals; a fourth rectifier operating independently of said network to be coupled to said supply for deriving from said supply a second rectified potential; said second potential being derivable at a second voltage absorbing component across a third pair of terminals; a conductor connecting a first electrical point on said first component selectable at the will of an operator and a second electrical point on said second component selectable at the will of the operator; connections between each of said control electrodes and one of said end taps and connections between the common junction of said cathodes and the common junction of one each of said second and third pairs.

WILLIAM E. LARGE.

REFERENCES CITED

The following references are of record in the file of this patent:

UNITED STATES PATENTS

| Number | Name | Date |
|---|---|---|
| 1,941,076 | Edwards | Dec. 26, 1933 |
| 2,082,496 | Howe | June 1, 1937 |
| 2,270,894 | Overbeck | Jan. 27, 1942 |
| 2,393,884 | Callender | Jan. 29, 1946 |